United States Patent [19]

Young et al.

[11] 4,044,490
[45] Aug. 30, 1977

[54] FISHING LURE

[76] Inventors: Walter M. Young, 27 Anderson St., Piedmont, S.C. 29673; Robert S. Young, Rte. 1, Pelzer, S.C. 29669

[21] Appl. No.: 670,105

[22] Filed: Mar. 25, 1976

[51] Int. Cl.² .................................. A01K 85/00
[52] U.S. Cl. .................................. 43/42.06; 43/44.99
[58] Field of Search ............... 43/42.06, 42.31, 42.35, 43/43.15, 44.99, 42.39

[56] References Cited

U.S. PATENT DOCUMENTS

| | | | |
|---|---|---|---|
| 2,716,830 | 9/1955 | Burden | 43/42.31 |
| 3,762,092 | 10/1973 | Bercz et al. | 43/42.35 |
| 3,835,572 | 9/1974 | Mounsey | 43/42.06 |
| 3,877,168 | 4/1975 | Stevens | 43/42.31 |

Primary Examiner—Russell R. Kinsey
Assistant Examiner—Peter K. Skiff
Attorney, Agent, or Firm—Bailey, Dority & Flint

[57] ABSTRACT

An artificial fishing lure having hooks thereon is adapted to receive a tablet which generates a gas when contacted by water so that as the lure is pulled through the water bubbles are generated. The lure is constructed of a rigid unitary body having a pivotal door adjacent the top with rows of holes provided above and below a trailing hook through which the gas bubbles are discharged.

1 Claim, 3 Drawing Figures

FISHING LURE

BACKGROUND OF THE INVENTION

The present invention relates to a fishing lure, and more particularly to an artificial fishing lure which discharges bubbles through holes provided on opposite sides of a hook as it is pulled through the water.

Examples of fishing lures in which tablets are placed to generate gas when coming in contact with the water are illustrated in U.S. Pat. Nos. 3,105,317 and 2,803,915. In U.S. Pat. No. 3,105,317 pliable lures representing crawfish, frogs, worms, etc. are provided with a cavity into which a gas generating tablet is placed. Tubular passageways extend through the pliable lure through which water is supposed to pass for contacting the tablet. When the water contacts the tablet, it generates a stream of gas bubbles which are expelled through various passages.

In U.S. Pat. No. 2,803,915 there is illustrated a fishing lure which is supposed to simulate an injured frog. This lure has a cavity provided therein into which a gas generating tablet is carried. As the tablet contacts the water bubbles are expelled through the bottom thereof for imparting movement to the lure.

Other similar fishing lures and aquatic toys are illustrated in U.S. Pat. Nos. 2,599,128, 2,932,916, and 2,833,216.

While in some instances the above described devices may be satisfactory for the purposes intended, it has been found that it is more desirable to have a fishing lure which generates streams of bubbles that are expelled from the rear of the lure when the lure is running beneath the water.

SUMMARY OF THE INVENTION

The invention includes an artificial fishing lure having hooks thereon provided for receiving a tablet that generates a gas when contacted by water so that as the lure is pulled through the water bubbles are generated for attracting the attention of fish. The lure includes a rigid unitary body having a rounded front portion and a rearwardly and inwardly tapered rear portion. The body is formed by a pair of molded shells secured together by adhesive. The shells are substantially concave so as to define a cavity therebetween when they are secured together. A pivotal door is carried in a top portion of the body for providing access to the cavity so that tablets can be deposited therein. Weights are carried within the cavity for causing the lure to sink when in water. A hole is provided adjacent the front portion of the rigid body through which water flows into the cavity for contacting the tablet when the plug is being fished. A treble hook is attached to the extreme rear portion of the plug and a row of holes is provided above the treble hook and another row of holes is provided below the treble hook so that bubbles being discharged through the holes encompasses the treble hook.

Accordingly, it is an important object of the present invention to provide a fishing lure which generates gas bubbles when being pulled through the water.

Still another important object of the present invention is to provide a fishing lure that has a cavity therein into which a tablet is placed for generating gas when contacting water for expelling bubbles out a plurality of rows of holes carried in the rear of the plug so as to encompass a hook carried on the plug.

Still another important object of the present invention is to provide a relatively simple and inexpensive fishing lure which runs beneath the water and generates gas bubbles for attracting the attention of fish.

These and other objects and advantages of the invention will become apparent upon reference to the following specification, attendant claims, and drawing.

DESCRIPTION OF A PREFERRED EMBODIMENT

Figure 1:
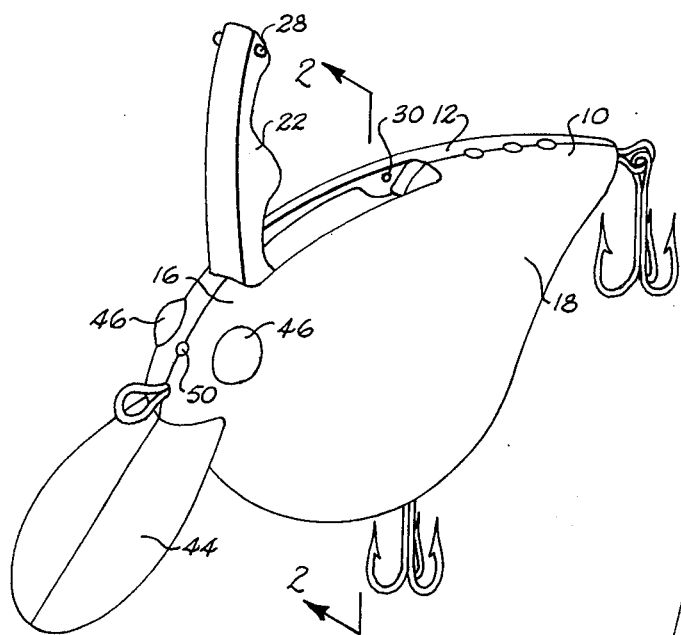
FIG. 1 is an enlarged perspective view illustrating a fishing lure constructed in accordance with the present invention.
Figure 2:
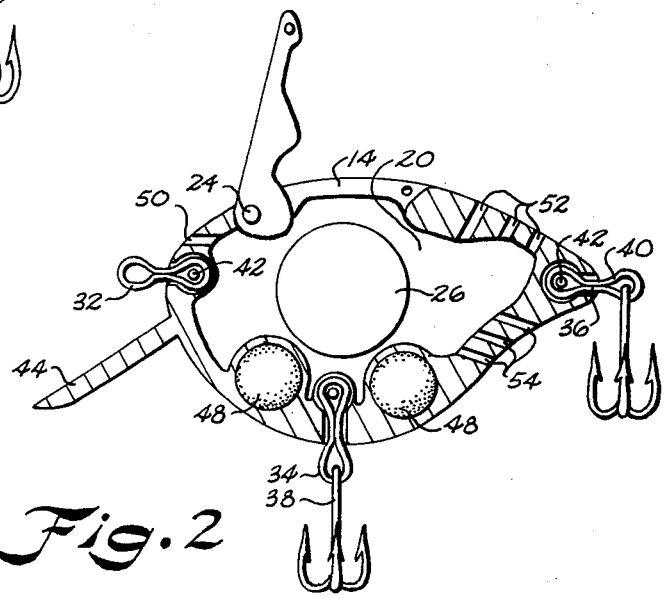
FIG. 2 is a sectional view taken along the line 2—2 of FIG. 1.

Referring in more detail to the drawing, there is illustrated a fishing lure constructed of two identical shells 10 and 12 which are glued together along their seams 14 by any suitable adhesive. The shells are molded from any suitable plastic which generates a rigid hard body.

The shells are concave and when glued together produce a rigid unitary body construction having a rounded front portion 16 and a rearwardly and inwardly tapered rear portion 18. As previously mentioned, the shells 10 and 12 are substantially concave so as to define a cavity 20 therebetween when secured together. A pivotal door 22 which is hinged on pins 24 is carried in the top portion of the body for providing access to the cavity 20 so that tablets 26 can be placed in the cavity. Rounded protrusions 28 are carried on the outer end of the door 22 for fitting within notches 30 for securing the door closed.

Wire fasteners 32, 34 and 36 each of which have a pair of opposed loop portions provided for receiving the line 32a, and treble hooks 38 and 40. The inner loop portion of each of the fasteners is positioned around a horizontal post 42 for securing such to the plug.

A duck bill 44 is provided on the front of the plug for causing the plug to dive when pulled through the water. Eyes 46 are also provided on the plug. Normally, the plug is painted colors for attracting fish. Positioned in the lower portion of the cavity 20 are two smaller cavities into which lead shot 48 are provided for weighting the plug.

The tablet 26 may be constructed of any suitable material which generates gas bubbles when exposed to water. It has also been found that various scents and flavors can be added to the tablet for simulating a particular taste and scent, as for example, shrimp, strawberries, grapes, blueberries, etc.

Figure 3:
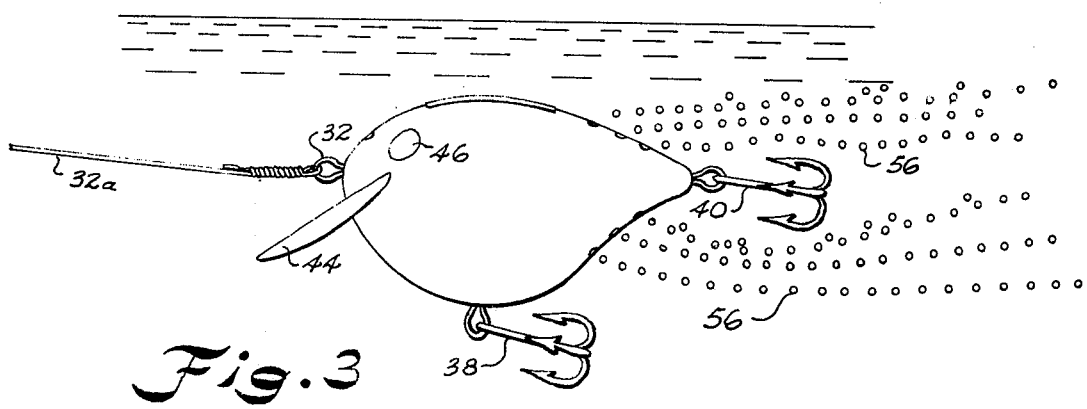
FIG. 3 is a perspective view illustrating the fishing lure being pulled through the water generating gas bubbles.

The passage 50 is provided in the top front portion of the plug for permitting water to pass into the cavity when the plug is being fished. The tablet 26, in turn, generates gas bubbles which are discharged through a plurality of passages 52 provided in the top of the plug and a plurality of passages 54 provided in the lower rear end of the plug. These bubbles 56 as shown in FIG. 3, encompass the rear hook as the plug is pulled through the water. As a result of the weight 48 carried within the cavity and the duck bill 44, the plug dives towards the bottom of the lake when being fished. The depth that the plug runs while being retrieved depends on the rate that it is being retrieved.

While a preferred embodiment of the invention has been described using specific terms, such description is for illustrative purposes only, and it is to be understood that changes and variations may be made without departing from the spirit or scope of the following claims.

What is claimed is:

1. An artificial fishing lure provided for receiving a tablet which generates a gas when contacted by water so that as the lure is pulled through the water bubbles are generated for attracting the attention of fish, said lure comprising:

a rigid unitary body construction, said rigid body having a rounded front portion and a rearwardly and inwardly tapered rear portion, said body being formed by a pair of molded shells secured together by adhesive, said shells being substantially concave so as to define a cavity therebetween when secured together, a pivotal door carried in a top portion of said body for providing access to said cavity so that said tablet can be deposited therein, cooperating latch means carried by said pivotal door and said body holding said door closed, weights carried in said cavity for causing said lure to sink in water, a hole provided in a front portion of said rigid body through which water flows to said cavity for contacting said table when said plug is being fished, (and) a treble hook attached to the extreme rear portion of said body, a row of holes provided in said housing above said treble hook, and a row of holes provided in said housing below said treble hook so that gas bubbles generated by said tablet encompass said treble hook as they are discharged through said rows of holes.

* * * * *